(12) United States Patent
Maeda

(10) Patent No.: US 8,823,310 B2
(45) Date of Patent: Sep. 2, 2014

(54) STEPPING MOTOR CONTROLLER AND IMAGE-READING DEVICE

(75) Inventor: Jyunji Maeda, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 422 days.

(21) Appl. No.: 13/221,357

(22) Filed: Aug. 30, 2011

(65) Prior Publication Data

US 2012/0049780 A1    Mar. 1, 2012

(30) Foreign Application Priority Data

Aug. 31, 2010 (JP) .................... 2010-195108

(51) Int. Cl.
*H02P 8/00* (2006.01)

(52) U.S. Cl.
USPC ............... 318/696; 318/685; 318/164

(58) Field of Classification Search
CPC .......................................... H02P 8/14
USPC ........................ 318/696, 685, 164
See application file for complete search history.

(56) References Cited

U.S. PATENT DOCUMENTS

| | | | | |
|---|---|---|---|---|
| 5,895,140 | A * | 4/1999 | Koh et al. | 399/77 |
| 6,128,103 | A * | 10/2000 | Kawamura | 358/434 |
| 6,184,646 | B1 * | 2/2001 | Yagoshi et al. | 318/696 |
| 6,963,415 | B1 * | 11/2005 | Saito | 358/1.14 |
| 7,612,517 | B2 | 11/2009 | Takeda | |
| 7,615,961 | B2 * | 11/2009 | Kobayashi et al. | 318/685 |
| 2006/0267538 | A1 | 11/2006 | Takeda | |
| 2008/0012523 | A1 | 1/2008 | Kobayashi et al. | |
| 2008/0019677 | A1 | 1/2008 | Ando | |
| 2009/0315503 | A1 | 12/2009 | Yoshihisa et al. | |

FOREIGN PATENT DOCUMENTS

| | | |
|---|---|---|
| CN | 1881778 A | 12/2006 |
| CN | 101072008 A | 11/2007 |
| JP | Sho-63-48199 | 2/1988 |

(Continued)

OTHER PUBLICATIONS

Office Action dated Sep. 11, 2012 received from the Japanese Patent Office from related Japanese Application No. 2010-195108, together with an English-language translation.

(Continued)

*Primary Examiner* — Erick Glass
(74) *Attorney, Agent, or Firm* — Scully, Scott, Murphy & Presser PC

(57) ABSTRACT

A stepping motor controller for controlling a stepping motor, includes: a motor driver; and a driver control unit. The motor driver includes: an excitation phase control unit; and a drive unit. The driver control unit includes: a motor driver power control unit; a drive control unit; a clock signal output unit; and an excitation phase storing unit. The excitation phase storing unit acquires an excitation phase at a time when the motor driver power control unit stops supplying electricity to the motor driver, and stores the acquired excitation phase as a suspension excitation phase. When the motor driver power control unit resumes supplying electricity to the motor driver, the drive control unit instructs the drive unit to continue to halt the supply of the drive current until the excitation phase signal is updated, in response to each pulse of the clock signal, to an excitation phase signal specifying the suspension excitation phase, and instructs the drive unit to supply the drive current after the excitation phase signal is updated to reach the excitation phase signal specifying the suspension excitation phase.

7 Claims, 12 Drawing Sheets

(56) References Cited

FOREIGN PATENT DOCUMENTS

| JP | H8-37799 A | 2/1996 |
|---|---|---|
| JP | 2000-134993 A | 5/2000 |
| JP | 2006-288056 A | 10/2006 |
| JP | 2008-29146 A | 2/2008 |
| JP | 2009-273334 | 11/2009 |

OTHER PUBLICATIONS

Chinese Notification of First Office Action dated Oct. 9, 2013 together with English language translation.

* cited by examiner

STEPPING MOTOR CONTROLLER AND IMAGE-READING DEVICE

CROSS REFERENCE TO RELATED APPLICATION

This application claims priority from Japanese Patent Application No. 2010-195108 filed Aug. 31, 2010. The entire content of this priority application is incorporated herein by reference.

TECHNICAL FIELD

The present invention relates to a stepping motor controller having a motor driver for driving a stepping motor while updating the excitation phase in response to a clock signal, and an image-reading device that performs an operation using the stepping motor controller to read images.

BACKGROUND

A stepping motor is typically configured of a rotor fixed to the rotating drive shaft of the motor, and a stator mounted around the rotor. The motor driver for driving the stepping motor can drive the rotor in a forward rotation in fixed angular increments by sequentially applying electric current corresponding to the excitation phase to coils wound about the stator. The excitation phase specifies how the motor driver supplies electric current to the coils in the stepping motor. The rotational position of the stepping motor (rotor position) is therefore determined according to this excitation phase.

The motor drivers used to drive stepping motors come in two types: a clock input type and a parallel input type. This is described in United States Patent Application Publication No. 2008/0019677A1, for example.

A control unit, configured of a CPU, ASIC, or the like, is configured to update the excitation phase and to supply the motor driver of the parallel input type with those control signals that are indicative of the polarity and the amount of the current that should be supplied to the coils to attain the updated excitation phase. The motor driver drives the stepping motor by supplying the coils with the current whose polarity and amount are determined by the control signals.

Contrarily, the control unit supplies the motor driver of the clock input type with: a clock signal indicating the timing for switching the excitation phase; an excitation mode signal indicating the excitation mode for the motor; and a rotating direction signal indicating the direction in which the motor should be rotated. The motor driver updates the excitation phase based on the received signals, and drives the stepping motor by supplying the coils with the current whose polarity and amount are determined by the updated excitation phase.

There has been proposed a recording device which employs a stepping motor and whose control unit stores data of the final excitation phase of the stepping motor at the time the recording device enters a sleep mode to halt the motor. When the recording device is awakened from the sleep mode, the control unit reads the data of the final excitation phase, and resumes driving the stepping motor via a motor driver based on the read data of the final excitation phase. This conventional recording device is described in U.S. Pat. No. 6,963,415B1.

SUMMARY

If the motor driver of the parallel input type is employed as the motor driver for the conventional recording device, when the recording device is awakened from the sleep mode, the control unit can supply the motor driver with the control signals corresponding to the final excitation phase. Accordingly, by supplying the coils with the current according to the control signals, the motor driver can resume driving the stepping motor from the rotational position at which the motor was halted before the recording device entered the sleep mode.

It is also conceivable to employ the motor driver of the clock input type as the motor driver for the conventional recording device described above. In this case, however, it is impossible to resume driving the stepping motor always from the rotational position at which the motor was halted before the recording device entered the sleep mode. This is because the clock input type motor driver is configured to update the excitation phase from a predetermined initial excitation phase when the supply of current to the motor driver is resumed after the sleep mode.

In view of the foregoing, it is an object of the present invention to provide a clock input type stepping motor controller that, when resuming the supply of power to the motor driver after a temporary suspension, is capable of resuming driving of the stepping motor from the rotational position at which the stepping motor was halted when the supply of power was suspended. It is another object of the present invention to provide an image-reading device that employs the stepping motor controller in operations for reading images.

In order to attain the above and other objects, the invention provides a stepping motor controller for controlling a stepping motor, the stepping motor controller including: a motor driver that is configured to drive a stepping motor; and a driver control unit that is configured to control the motor driver. The motor driver includes: an excitation phase control unit; and a drive unit. The excitation phase control unit is configured to receive pulses of a clock signal and to update and output an excitation phase signal indicating an excitation phase of the stepping motor in response to each pulse of the clock signal. The drive unit is configured to receive the excitation phase signal and to supply a drive current to the stepping motor, the drive current corresponding to the excitation phase indicated by the received excitation phase signal. The driver control unit includes: a motor driver power control unit; a drive control unit; a clock signal output unit; and an excitation phase storing unit. The motor driver power control unit controls whether or not to supply electricity to the motor driver. The drive control unit instructs the drive unit to supply the drive current to the stepping motor or to stop supplying the drive current to the stepping motor. The clock signal output unit outputs the clock signal to the excitation phase control unit. The excitation phase storing unit acquires an excitation phase at a time when the motor driver power control unit stops supplying electricity to the motor driver, and stores the acquired excitation phase as a suspension excitation phase. When the motor driver power control unit resumes supplying electricity to the motor driver, the drive control unit instructs the drive unit to continue to halt the supply of the drive current until the excitation phase signal is updated, in response to each pulse of the clock signal, to an excitation phase signal specifying the suspension excitation phase, and instructs the drive unit to supply the drive current after the excitation phase signal is updated to reach the excitation phase signal specifying the suspension excitation phase.

According to another aspect, the present invention provides an image-reading device including: the stepping motor controller described above; a reading unit that is configured to use the rotation of the stepping motor in operations for reading images; and an adjusting unit that performs an adjustment to adjust the reading unit before the reading unit begins a read operation; wherein the drive control unit executes a process, in parallel with the adjustment performed by the adjusting unit, to instruct the drive unit to continue to halt the supply of the drive current to the stepping motor until the excitation phase signal is updated to an excitation phase signal specifying the suspension excitation phase.

BRIEF DESCRIPTION OF THE DRAWINGS

The particular features and advantages of the invention as well as other objects will become apparent from the following description taken in connection with the accompanying drawings, in which.

DETAILED DESCRIPTION

Structure of a Stepping Motor Controller

Figure 1:
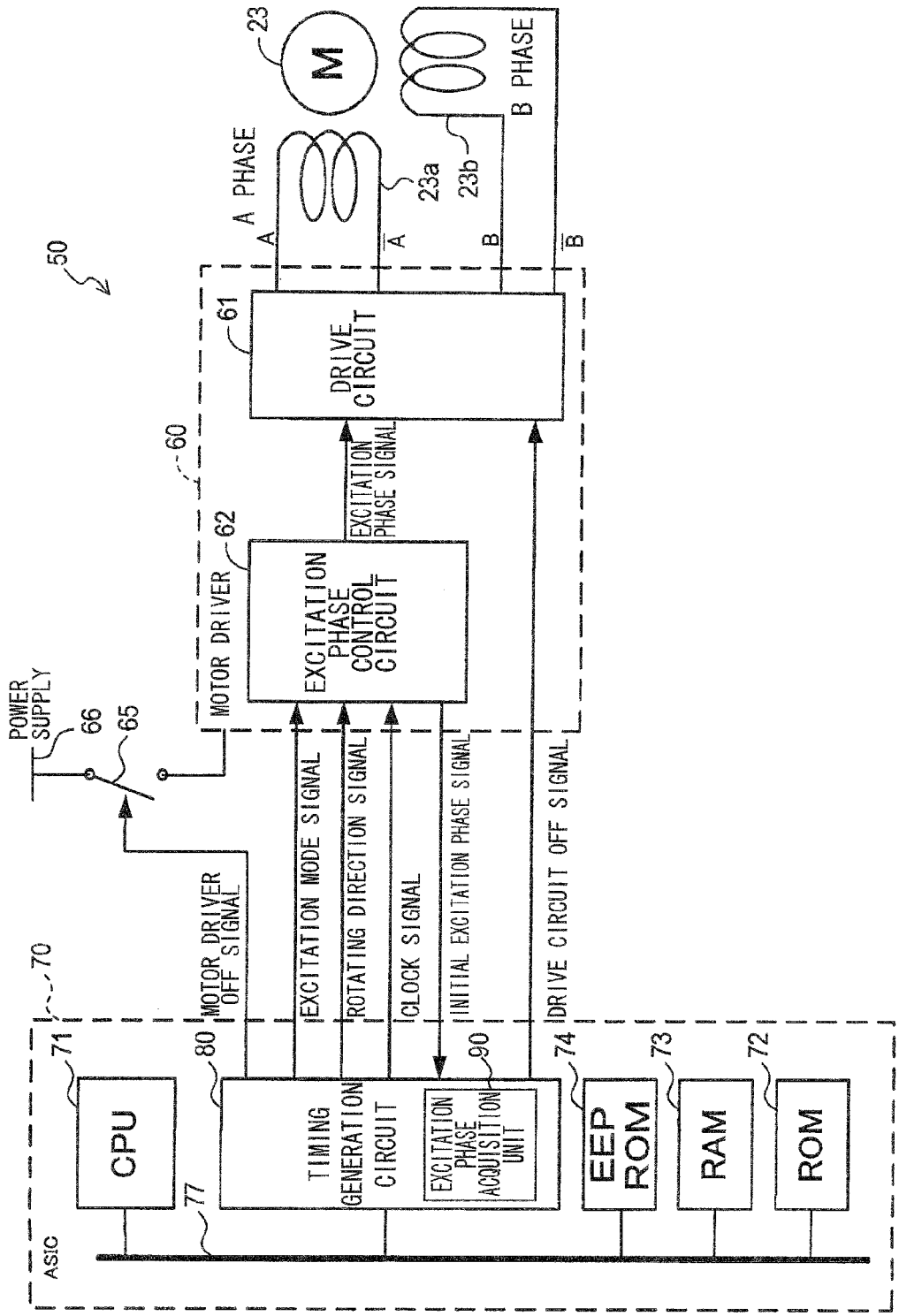
FIG. 1 is a block diagram showing the structure of a stepping motor controller according to an embodiment of the present invention.

An embodiment of the present invention will be described while referring to the accompanying drawings. FIG. 1 is a block diagram showing the structure of a stepping motor controller (hereinafter abbreviated as "motor controller") 50 according to the embodiment of the present invention. As shown in FIG. 1, the motor controller 50 is configured of a motor driver 60 having a switch 65 described later; and an application-specific integrated circuit (ASIC) 70 that controls the motor driver 60. The motor controller 50 functions to control a stepping motor (hereinafter simply "motor") 23.

The ASIC 70 does not function solely to control the motor driver 60. For example, when the motor 23 is incorporated in an image-reading device 1 described later (see FIG. 4) and the motor controller 50 controls the motor 23, the ASIC 70 may be configured to control a reading unit 21 described later and other components provided in the image-reading device 1 in addition to the motor driver 60.

The motor 23 is a stepping motor that is driven to rotate to angular positions corresponding to an excitation phase when the motor driver 60 supplies drive current corresponding to the excitation phase to an A phase coil 23a and a B phase coil 23b. To achieve this, the motor driver 60 is provided with a drive circuit 61 for applying drive current corresponding to the specified excitation phase to the A phase coil 23a and B phase coil 23b, and an excitation phase control circuit 62 for transmitting an excitation phase signal indicating this excitation phase to the drive circuit 61. The motor driver 60 is also connected to a power supply 66 via the switch 65.

The ASIC 70 is a control circuit that includes a CPU 71, a ROM 72, a RAM 73, and a EEPROM 74, all of which components are interconnected through a bus 77. The ASIC 70 also has a timing generation circuit 80 for exchanging the following signals with the motor driver 60 and the like. For example, the timing generation circuit 80 transmits a motor driver OFF signal to the switch 65 for switching the switch 65 on and off. That is, the motor driver OFF signal of a high level switches the switch 65 off. The timing generation circuit 80 also transmits signals to the excitation phase control circuit 62, including an excitation mode signal indicating the excitation mode for the motor 23, a rotating direction signal indicating the direction in which the motor 23 should be rotated (i.e., clockwise (CW) or counterclockwise (CCW)) about its axis of rotation, and a clock signal indicating the timing for switching the excitation phase.

The excitation phase control circuit 62 in the motor driver 60 is configured as a logic circuit that updates the excitation phase for each pulse of a clock signal inputted from the timing generation circuit 80 based on the excitation mode signal and the rotating direction signal.

Figure 2:
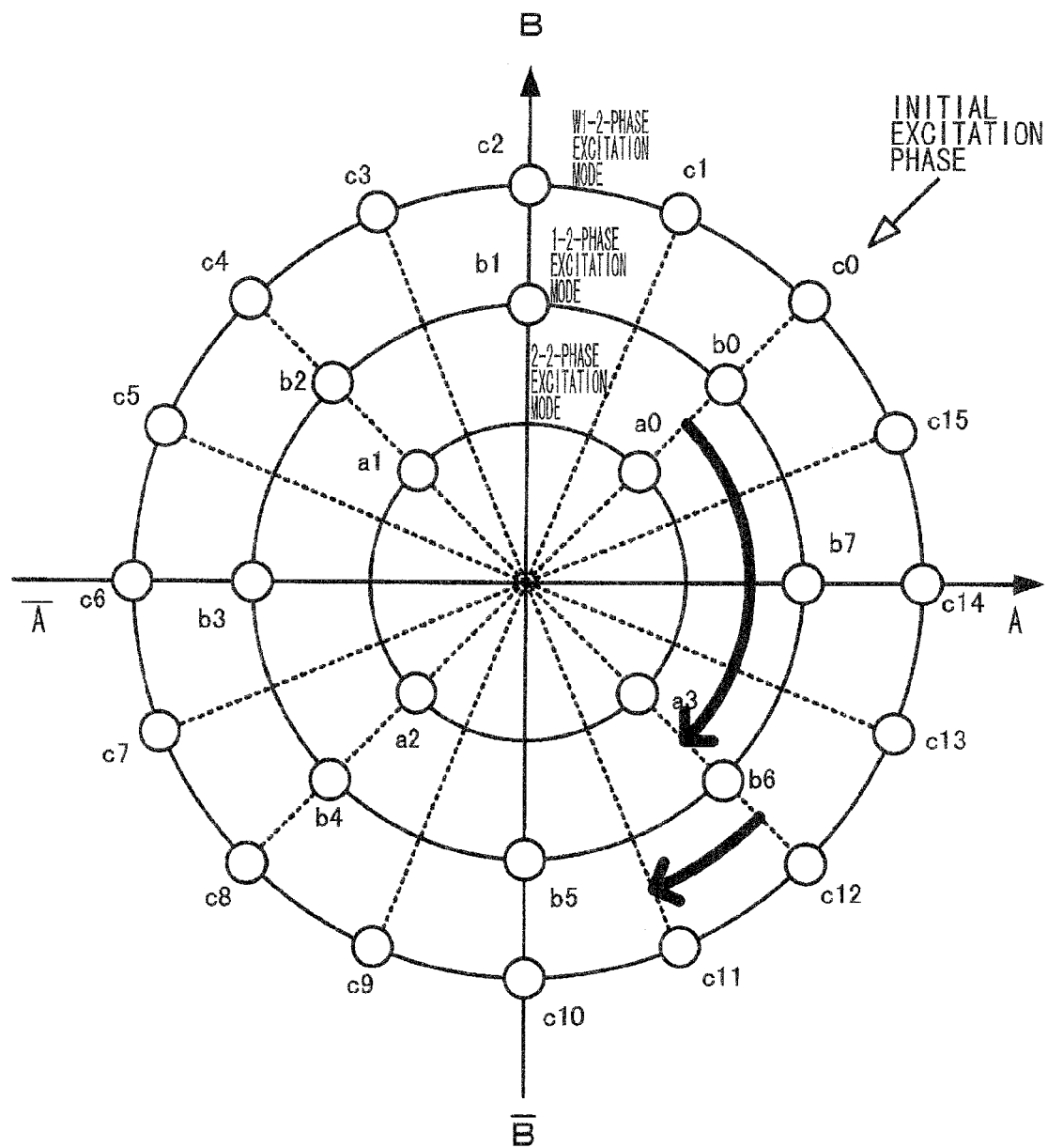
FIG. 2 shows excitation phases for each of three excitation modes provided by an excitation phase control circuit shown in FIG. 1.

FIG. 2 shows the excitation phases of the excitation phase control circuit 62 for three excitation modes, including W1-2-phase excitation, 1-2-phase excitation, and 2-2-phase excitation. The excitation phase of the excitation phase control circuit 62 is updated for each pulse of the clock signal inputted from the timing generation circuit 80.

Take, for example, the case in which the signals inputted into the excitation phase control circuit 62 are W1-2 phase as the excitation mode signal, CCW (counterclockwise) as the rotating direction signal, and a clock signal of a prescribed pulse interval. In this case, the excitation phase of the excitation phase control circuit 62 is updated counterclockwise in FIG. 2, as in ... →c1→c2→ ..., for each pulse of the inputted clock signal.

Hence, when the excitation mode is W1-2-phase excitation, the excitation phase of the excitation phase control circuit 62 completes one cycle for every 16 pulses of the clock signal. Similarly, the excitation phase completes one cycle for every 8 pulses of the clock signal when the excitation mode is 1-2-phase excitation, and for every 4 pulses of the clock signal when the excitation mode is 2-2-phase excitation.

Each time the excitation phase is updated, the excitation phase control circuit 62 outputs an excitation phase signal indicating the updated excitation phase to the drive circuit 61. The excitation phase control circuit 62 preserves excitation phase data while the power to the motor driver 60 remains on. However, when the power is turned off, the excitation phase control circuit 62 no longer retains the excitation phase data. Thus, when the power to the motor driver 60 is turned on once again, the excitation phase control circuit 62 updates the excitation phase for each pulse of the clock signal beginning from the initial excitation phase (i.e., c0 phase, b0 phase, or a0 phase).

When updating the excitation phase to the initial excitation phase, the excitation phase control circuit 62 transmits an initial excitation phase signal to the timing generation circuit 80. Here, the timing generation circuit 80 is also provided with an excitation phase acquisition unit 90 for acquiring the excitation phase of the excitation phase control circuit 62.

The timing generation circuit 80 also transmits a drive circuit OFF signal to the drive circuit 61 of the motor driver 60 for commanding or halting the supply of drive current from the drive circuit 61. The drive circuit OFF signal of a high level cuts off the supply of power.

Figure 3:
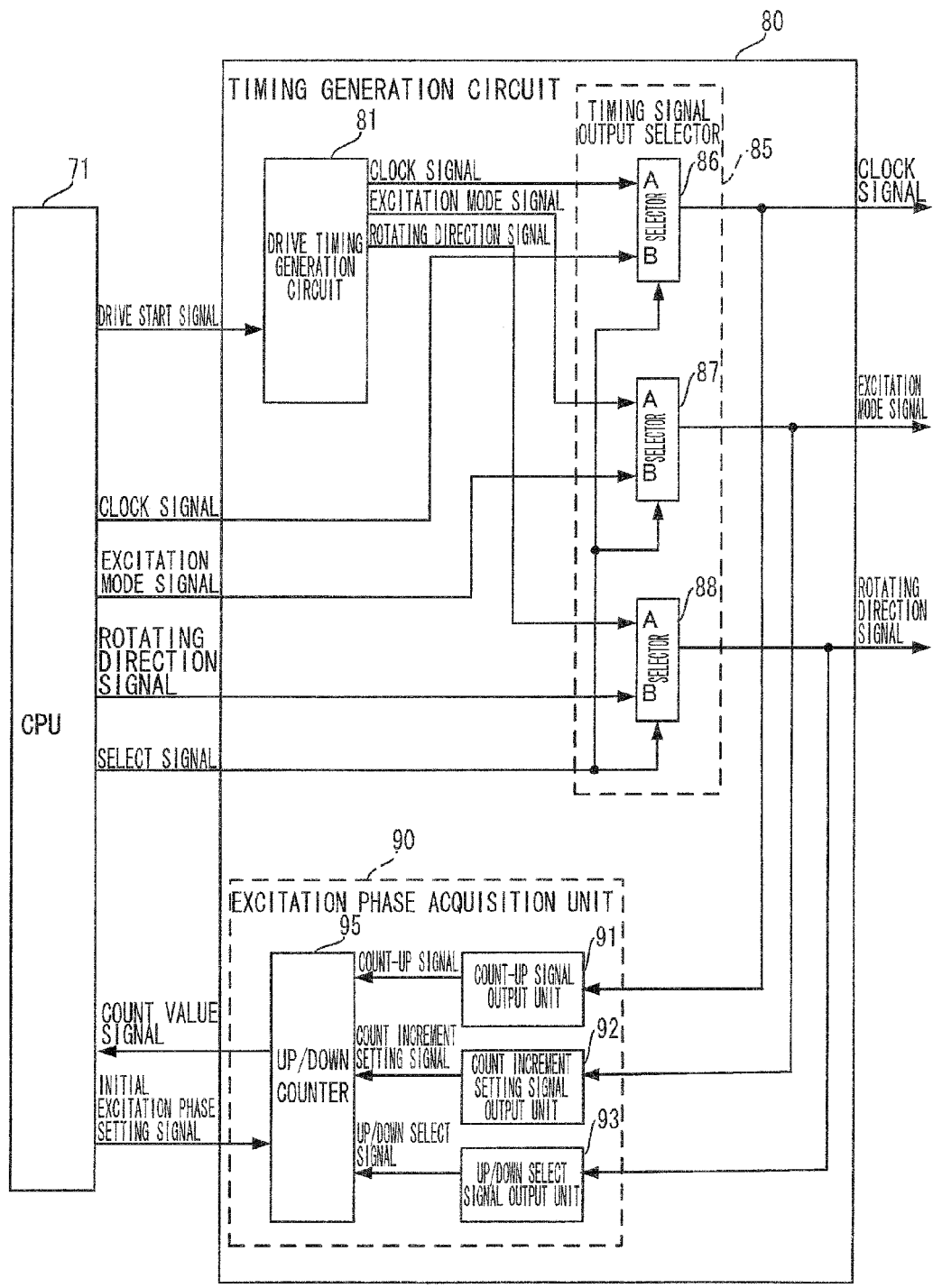
FIG. 3 is a block diagram showing a configuration of a timing generation circuit shown in FIG. 1.

FIG. 3 is a block diagram showing a configuration of the timing generation circuit 80.

As shown in FIG. 3, the timing generation circuit 80 includes: a drive timing generation circuit 81; a timing signal output selector 85; and the excitation phase acquisition unit 90. Although not shown in the drawing, the timing generation circuit 80 is further provided with: a portion that is configured to output the motor driver OFF signal of a high or low level to the switch 65 in accordance with a command received from the CPU 71; a portion that is configured to receive the initial excitation phase signal from the excitation phase control circuit 62 and to transfer the received initial excitation phase signal to the CPU 71; and a portion that is configured to output the drive circuit OFF signal of a high or low level to the drive circuit 61 in accordance with a command received from the CPU 71.

Figure 8:
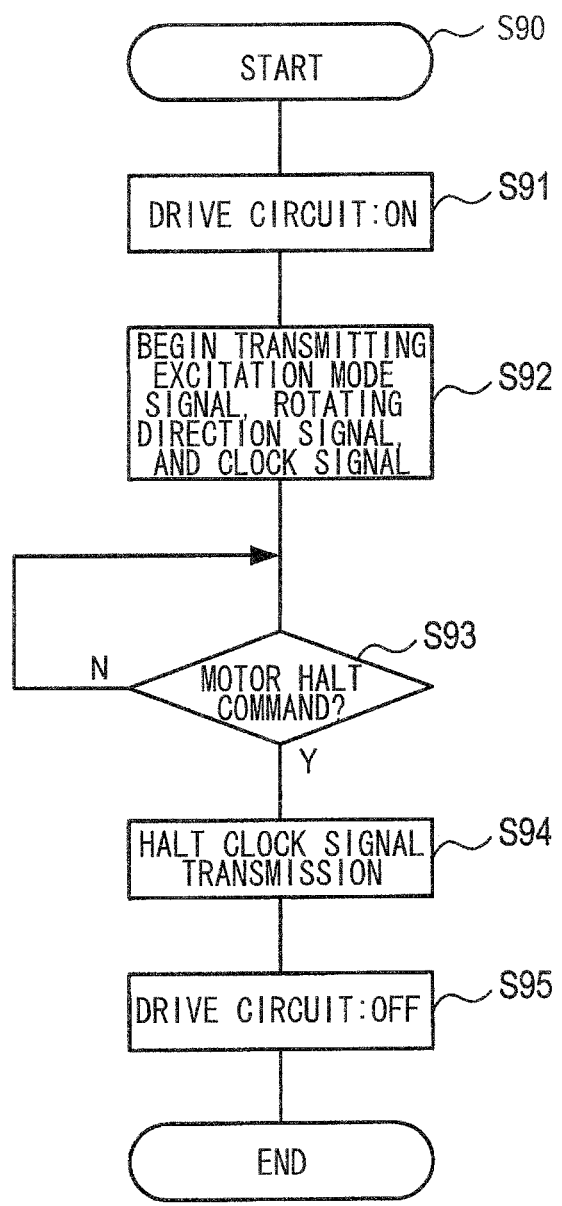
FIG. 8 is a flowchart illustrating steps in a drive process shown in the motor control process of FIG. 6.

The drive timing generation circuit 81 is configured of a logic circuit for automatically generating the clock signal, excitation mode signal, and rotating direction signal in hardware upon receiving a drive start signal from the CPU 71. The drive timing generation circuit 81 generates the clock signal, excitation mode signal, and rotating direction signal for being used for driving the motor 23. Although not shown, the drive timing generation circuit 81 is configured to receive from the CPU 71 a command indicative of: an excitation mode (W1-2-phase excitation, 1-2-phase excitation, or 2-2-phase excitation) that is suitable for a driving operation to be executed; a rotating direction (clockwise (CW) or counterclockwise (CCW)) that is suitable for the driving operation to be executed; and a clock pulse interval that is greater than or equal to a predetermined minimum pulse interval, at which the stepping motor 23 can operate, and therefore that is suitable for the driving operation to be executed. The drive timing generation circuit 81 generates the excitation mode signal specifying the excitation mode indicated by the received command; the rotating direction signal specifying the rotating direction indicated by the received command; and the clock signal of a pulse interval indicated by the received command. These signals generated by the drive timing generation circuit 81 are used for driving the motor 23 during a driving process (FIG. 8).

Figure 10:
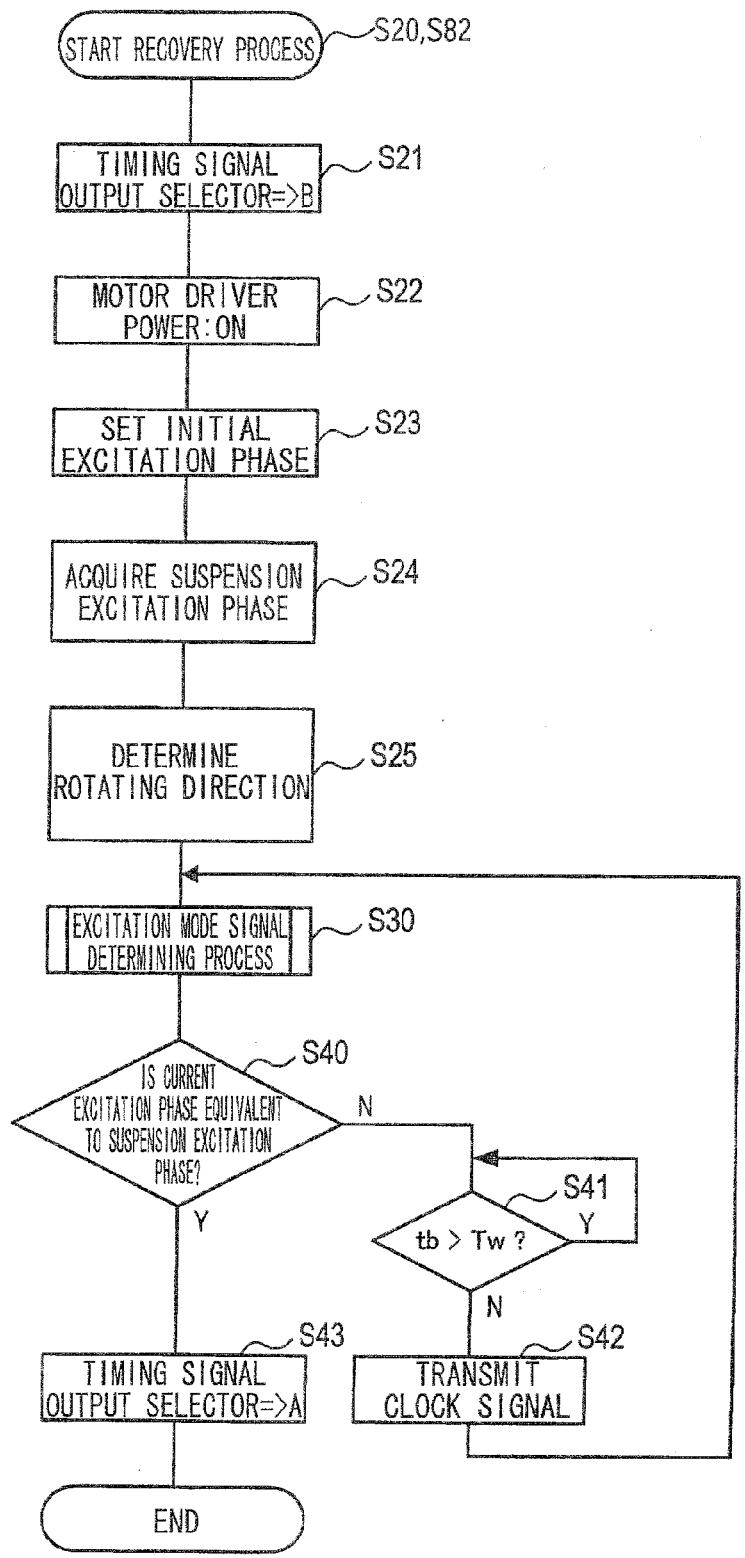
FIG. 10 is a flowchart illustrating steps in a recovery process shown in the motor control process of FIG. 6.

As will be described later, the CPU 71, per se. also generates another clock signal, another excitation mode signal, and another rotating direction signal during a recovery process (FIG. 10). During the recovery process, the CPU 71 generates the clock signal at a predetermined pulse interval "tb". The pulse interval "tb" is less than the minimum pulse interval, at which the stepping motor 23 can operate, and is greater than or equal to a minimum pulse interval, at which the excitation phase control circuit 62 can operate.

The timing signal output selector 85 is configured to toggle the signals transmitted to the excitation phase control circuit 62 between the signals generated by the drive timing generation circuit 81 and the signals generated by the CPU 71.

The timing signal output selector 85 includes selectors 86, 87, and 88. The selector 86 is for toggling the clock signal transmitted to the excitation phase control circuit 62 between the clock signal generated by the drive timing generation circuit 81 and the clock signal generated by the CPU 71. The selector 87 is for toggling the excitation mode signal transmitted to the excitation phase control circuit 62 between the excitation mode signal generated by the drive timing generation circuit 81 and the excitation mode signal generated by the CPU 71. The selector 88 is for toggling the rotating direction signal transmitted to the excitation phase control circuit 62 between the rotating direction signal generated by the drive timing generation circuit 81 and the rotating direction signal generated by the CPU 71.

The signals outputted from the drive timing generation circuit 81 are inputted into the A terminals of the respective selectors 86, 87, and 88, while the signals outputted from the CPU 71 are inputted into the B terminals of the same. Each selector 86, 87, and 88 is configured to receive a select signal transmitted from the CPU 71, and to switch the output between the input into the A terminal and the input into the B terminal according to the select signal.

The excitation phase acquisition unit 90 is provided so that the CPU 71 can learn the excitation phase of the excitation phase control circuit 62. The excitation phase acquisition unit 90 includes a count-up signal output unit 91, a count increment setting signal output unit 92, an up/down select signal output unit 93, and an up/down counter 95.

The count-up signal output unit 91 is configured to transmit a count-up signal to the up/down counter 95 in synchronization with the clock signal outputted from the selector 86. The count increment setting signal output unit 92 is configured to transmit a count increment setting signal to the up/down counter 95 based on the excitation mode signal outputted from the selector 87. This count increment setting signal specifies the count increment amount to be used for one clock pulse. Specifically, the count increment setting signal output unit 92 transmits a "1" when the excitation mode specified by the excitation mode signal is W1-2-phase excitation, a "2" when the excitation mode is 1-2-phase excitation, and a "4" when the excitation mode is 2-2-phase excitation.

The up/down select signal output unit 93 is configured to transmit an up/down select signal specifying whether the up/down counter 95 should count up or count down according to the rotating direction signal outputted from the selector 88. The up/down select signal transmitted by the up/down select signal output unit 93 specifies "count up" when the rotating direction signal is counterclockwise and "count down" when the rotating direction signal is clockwise.

The up/down counter 95 is configured to count in increments specified in the count increment setting signal each time one pulse of a count-up signal synchronized with the clock signal is inputted. Thus, when the excitation mode is W1-2-phase excitation and the rotating direction signal is CCW, the count value of the up/down counter 95 advances in the order 0→1→2 . . . 15→0→1 . . . for each time one pulse of the count-up signal is inputted. Similarly, when the excitation mode is 1-2-phase excitation and the rotating direction signal is CCW, the count value of the up/down counter 95 advances in the order 0→2→4→6→ . . . 14→0→2 . . . for each pulse of the count-up signal inputted. Similarly, when the excitation mode is 1-2-phase excitation and the rotating direction signal is CW, the count value of the up/down counter 95 advances in the order 0→14→12→ . . . →2→0 . . . since the up/down select signal specifies "count down." The up/down counter 95 transmits its count value to the CPU 71 as a count value signal. The excitation phase acquisition unit 90 successively transmits to the CPU 71 the thus successively-advanced count value that is indicative of the successively-updated excitation phase. Thus, the excitation phase acquisition unit 90 successively acquires and outputs information indicative of the successively-updated excitation phase.

For each excitation mode, all the excitation phases are stored in the RAM 73 as count values. More specifically, for W1-2-phase excitation, the count values "0" for c0, "1" for c1, . . . , and "15" for c15 are stored in the RAM 73. For 1-2-phase excitation, the count values "0" for b0, "2" for b1, . . . , and "14" for b7 are stored in the RAM 73. For 2-2-phase excitation, the count values "0" for a0, "4" for a1, "8" for a2, and "12" for a3 are stored in the RAM 73.

The CPU 71 compares the count value signal received from the excitation phase acquisition unit 90 with the count values stored in the RAM 73 for all the excitation phases for the current excitation mode being executed, and determines that the excitation phase with the matching count value is the current excitation phase of the excitation phase control circuit 62, thereby knowing the current excitation phase of the excitation phase control circuit 62.

The CPU 71 is also configured to transmit an initial excitation phase setting signal to the up/down counter 95 for setting the count value to a value corresponding to the initial excitation phase.

Structure of an Image-Reading Device

Next, an image-reading device 1 will be described as an example of a device employing the motor controller 50.

Figure 4:
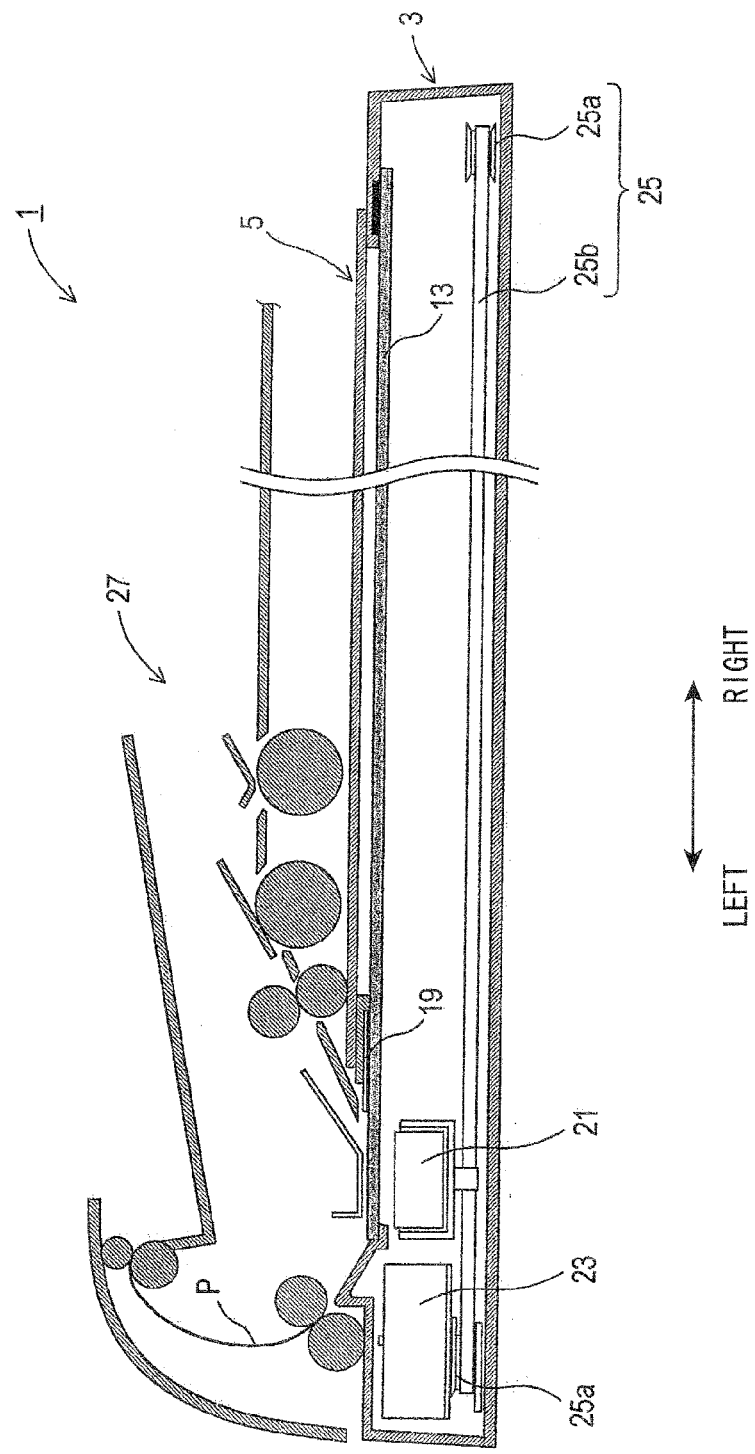
FIG. 4 is a schematic cross-sectional view of an image-reading device employing the stepping motor controller shown in FIG. 1.

FIG. 4 is a view taken along a longitudinal (the dimension corresponding to the moving direction of the reading unit 21 described later) cross section showing a general structure of the image-reading device 1. As shown in FIG. 4, the image-reading device 1 is configured as a flatbed scanner that includes a device body 3, and a flatbed cover 5 disposed on the device body 3 and capable of opening and closing on the same.

The device body 3 includes a platen glass 13 on which an original P may be placed for scanning, the reading unit 21, such as a CIS (contact image sensor) line sensor, for scanning an original P placed on the platen glass 13, a white reference member 19 used for scan preparation processes, the motor 23 that is controlled by the motor controller 50 to rotate, and a belt mechanism 25 for conveying the reading unit 21 in response to the rotation of the motor 23. The device body 3 also includes a user interface (not shown). The user of the image-reading device 1 can input instructions through this user interface instructing the image-reading device 1 to scan images from the original P or to shut off the main power supply for the image-reading device 1.

The belt mechanism 25 includes two pulleys 25a disposed in the device body 3 at opposite longitudinal ends, and a belt 25b looped around the pulleys 25a. The reading unit 21 is fixed to the belt 25b. The belt 25b circulates about the pulleys 25a in response to rotations of the motor 23, moving the reading unit 21 in the left and right directions (longitudinal directions of the image-reading device 1) in FIG. 4.

An original-conveying unit 27 is also provided on the flatbed cover 5 for feeding an original P to be scanned. Accordingly, the image-reading device 1 can scan an original P placed on the platen glass 13 or an original P conveyed by the original-conveying unit 27.

Main Routine of the Image-Reading Device

Next, a process executed by the CPU 71 of the motor controller 50 provided in the image-reading device 1 will be described.

Figure 5:
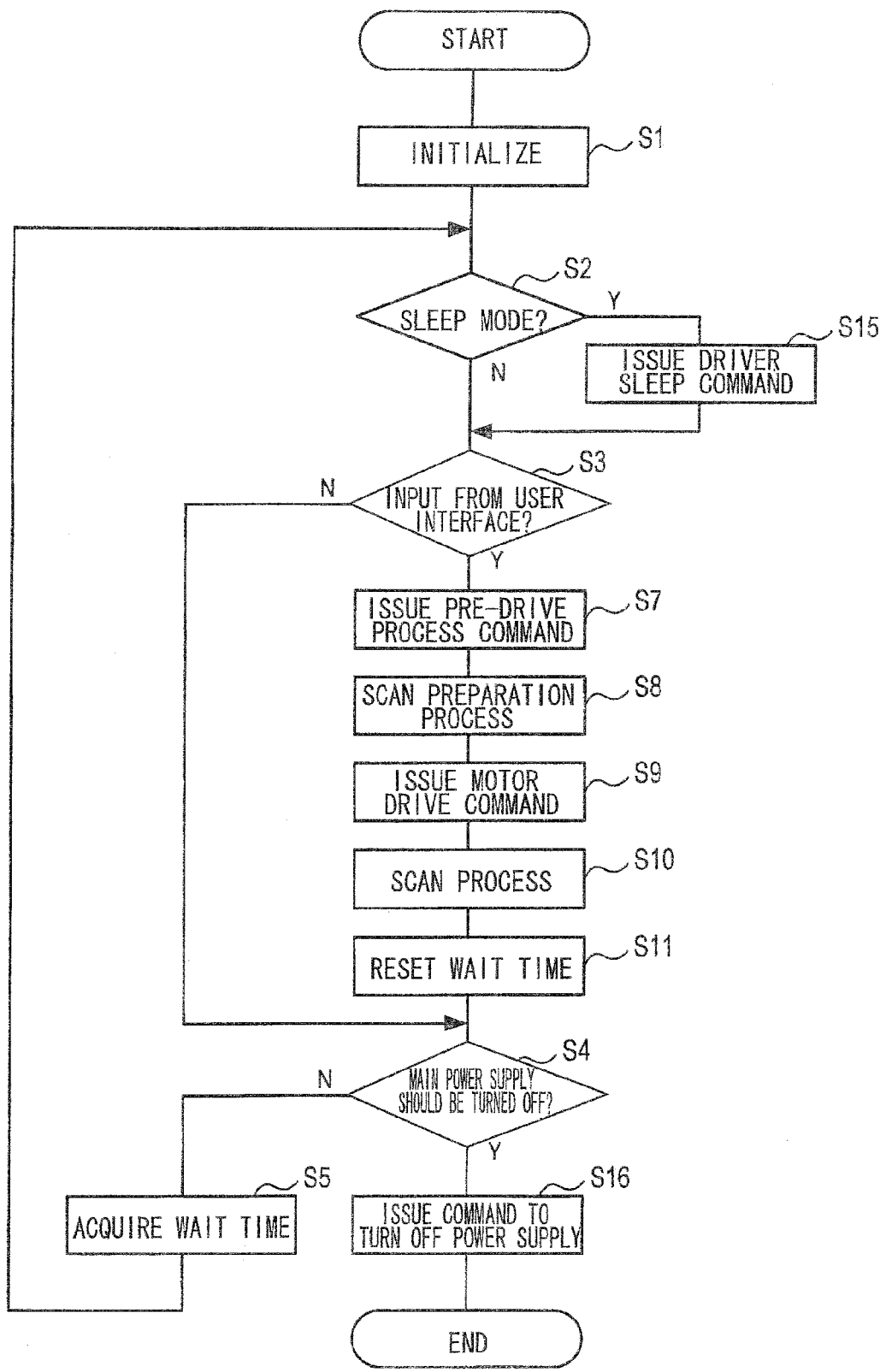
FIG. 5 is a flowchart showing the main routine of the image-reading device shown in FIG. 4.
Figure 6:
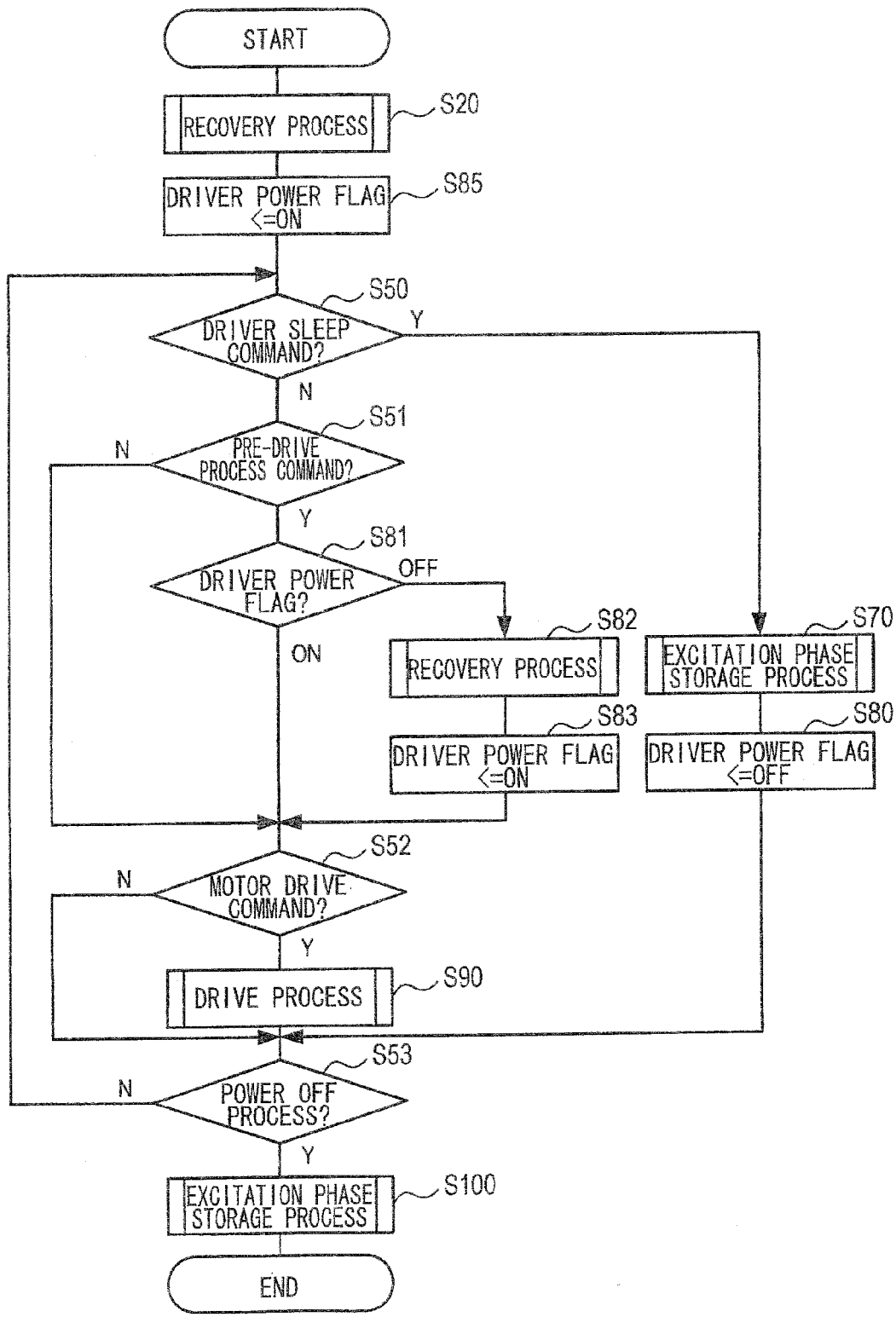
FIG. 6 is a flowchart showing a motor control process executed by the CPU in the stepping motor controller shown in FIG. 1.

The CPU 71 performs the main routine of the image-reading device 1 shown in FIG. 5 in parallel to and in coordination with a motor control process shown in FIG. 6. The CPU 71 implements the processes in FIG. 5 and FIG. 6 by executing programs stored in the ROM 72.

First, the main routine of the image-reading device 1 executed by the CPU 71 will be described with reference to the flowchart in FIG. 5. The CPU 71 begins this process when the power to the image-reading device 1 is turned on. In the flowchart of FIG. 5, steps in the main routine are denoted as "S" followed by a number. In S1 of FIG. 5 the CPU 71 performs various initializations. In S2 the CPU 71 determines whether the image-reading device 1 should be placed in a sleep mode in which the operating state of the CPU 71 is maintained but operations of the motor driver 60 and other components are suspended. As will be described later, during the sleep mode, the image-reading device 1 halts electric current supplied to the motor driver 60, but allows the ASIC 70 to continue processing (monitoring drive commands, for example).

Since the CPU 71 will reach a negative determination in S2 immediately after the power to the image-reading device 1 is turned on, the process advances to S3 in this case. In S3 the CPU 71 determines whether any user input has been received via the user interface. If there is no input from the user interface (S3: N), in S4 the CPU 71 determines whether a command was received from the user interface to turn off the main power supply of the image-reading device 1. If a command to turn off the main power supply to the image-reading device 1 was not received from the user interface (S4: N), in S5 the CPU 71 acquires a wait time (i.e., the time that the image-reading device 1 has been in standby with no operations performed on the user interface or the like) and returns to S2 described above. However, when the user inputted a command via the user interface to switch off the power supply to the image-reading device 1 (S4: Y), in S16 the CPU 71 issues a command to turn off the power supply to the image-reading device 1.

It is noted that the CPU 71 issues the command for cutting off the power supply to the image-reading device 1 in S16 after completing an excitation phase storage process described later in S100 of FIG. 6. Subsequently, the power supply to the image-reading device 1 is switched off.

Hence, after the power supply to the image-reading device 1 is turned on, the CPU 71 repeatedly loops through the processes in S2-S5. If the CPU 71 receives input from the user interface during this loop (S3: Y), the process advances to S7. For the following example, it will be assumed that the user input received from the user interface is a command for scanning images from an original P resting on the platen glass 13.

In S7 the CPU 71 issues a pre-drive process command. In S8 the CPU 71 executes scan preparation processes well known in the art. For example, the CPU 71 executes, as the scan preparation processes, light intensity adjustments and shading corrections for the reading unit 21 using the white reference member 19.

The scan preparation processes in S8 are performed in parallel with a process described later in FIG. 6 from the point that the CPU 71 reaches a YES determination in S51 until the process arrives at S52. The process described later in FIG. 6 from the point the CPU 71 reaches a YES determination in S51 until the process arrives at S52 is completed by the time the scan preparation processes in S8 are completed.

After completing the scan preparation processes in S8, in S9 the CPU 71 issues a motor drive command. Based on the motor drive command, the motor 23 is driven to begin moving the reading unit 21, as will be described later. While the reading unit 21 is moving, in S10 the CPU 71 executes a scan process to scan an image from the original P using the reading unit 21.

After completing the scan process, in S11 the CPU 71 resets the wait time, and the process advances to S4 described earlier.

Further, if the CPU 71 determines during the loop through the processes in S2-S5 that the image-reading device 1 should be placed in the sleep mode due to the wait time reaching a prescribed time, for example (S2: Y), in S15 the CPU 71 issues a driver sleep command and subsequently advances to S3 described earlier.

Overview of the Motor Control Process

FIG. 6 is a flowchart illustrating steps in the motor control process executed by the CPU 71 of the ASIC 70. The CPU 71 begins the motor control process when the power supply to the image-reading device 1 is turned on. In S20 at the beginning of the motor control process, the CPU 71 executes a recovery process described later. The recovery process serves to restore power to the motor driver 60.

In S85 the CPU 71 sets a driver power flag in the RAM 73 to ON. Here, the driver power flag indicates whether the power supply to the motor driver 60 is ON or OFF. In S50 the CPU 71 determines whether a driver sleep command was issued in S15 of the main routine in FIG. 5, which is executed as a parallel process. If a driver sleep command was not issued, such as immediately after the power supply was turned on (S50: N), the process advances to S51.

In S51 the CPU 71 determines whether a pre-drive process command was issued in S7 of FIG. 5. If a pre-drive process command has not been issued, such as immediately after the power supply was turned on (S51: N), the process advances to S52.

In S52 the CPU 71 determines whether a motor drive command was issued in S9 of FIG. 5. If a motor drive command has not been issued, such as immediately after the power supply was turned on (S52: N), the process advances to S53.

In S53 the CPU 71 determines whether a command to turn off the power supply to the image-reading device 1 was issued in S4 of FIG. 5. If a command to turn off the power supply was not issued (S53: N), the process returns to S50 described earlier.

In this way, the process loops through the processes of S50-S53. If a driver sleep command is issued in S15 of FIG. 5 while the CPU 71 is looping through the processes of S50-S53 (S50: Y), in S70 the CPU 71 executes an excitation phase storage process described later.

After completing the excitation phase storage process of S70, in S80 the CPU 71 sets the driver power flag in the RAM 73 to OFF. Subsequently, the CPU 71 returns to the loop through the processes of S50-S53.

Further, when the CPU 71 determines that a pre-drive process command was issued in S7 of FIG. 5 described earlier during the loop (S51: Y), the process advances to S81. In S81 the CPU 71 accesses the RAM 73 and determines whether the state of the driver power flag is OFF. If the driver power flag is OFF (S81: OFF), in S82 the CPU 71 executes the same recovery process described in S20. In S83 the CPU 71 sets the driver power flag to ON, and the process subsequently advances to S52 described earlier.

Further, if the CPU 71 determines that a motor drive command was issued in S9 of FIG. 5 (S52: Y), in S90 the CPU 71 executes a drive process described later. After completing the drive process of S90, the process returns to the loop through the processes of S50-S53 described above.

When the CPU 71 determines in S53 during the loop through the processes of S50-S53 that a command was issued in S4 of FIG. 5 to turn off the main power supply to the image-reading device 1 (S53: Y), in S100 the CPU 71 executes the same excitation phase storage process described in S70. Subsequently, the motor control process ends.

Figure 7:
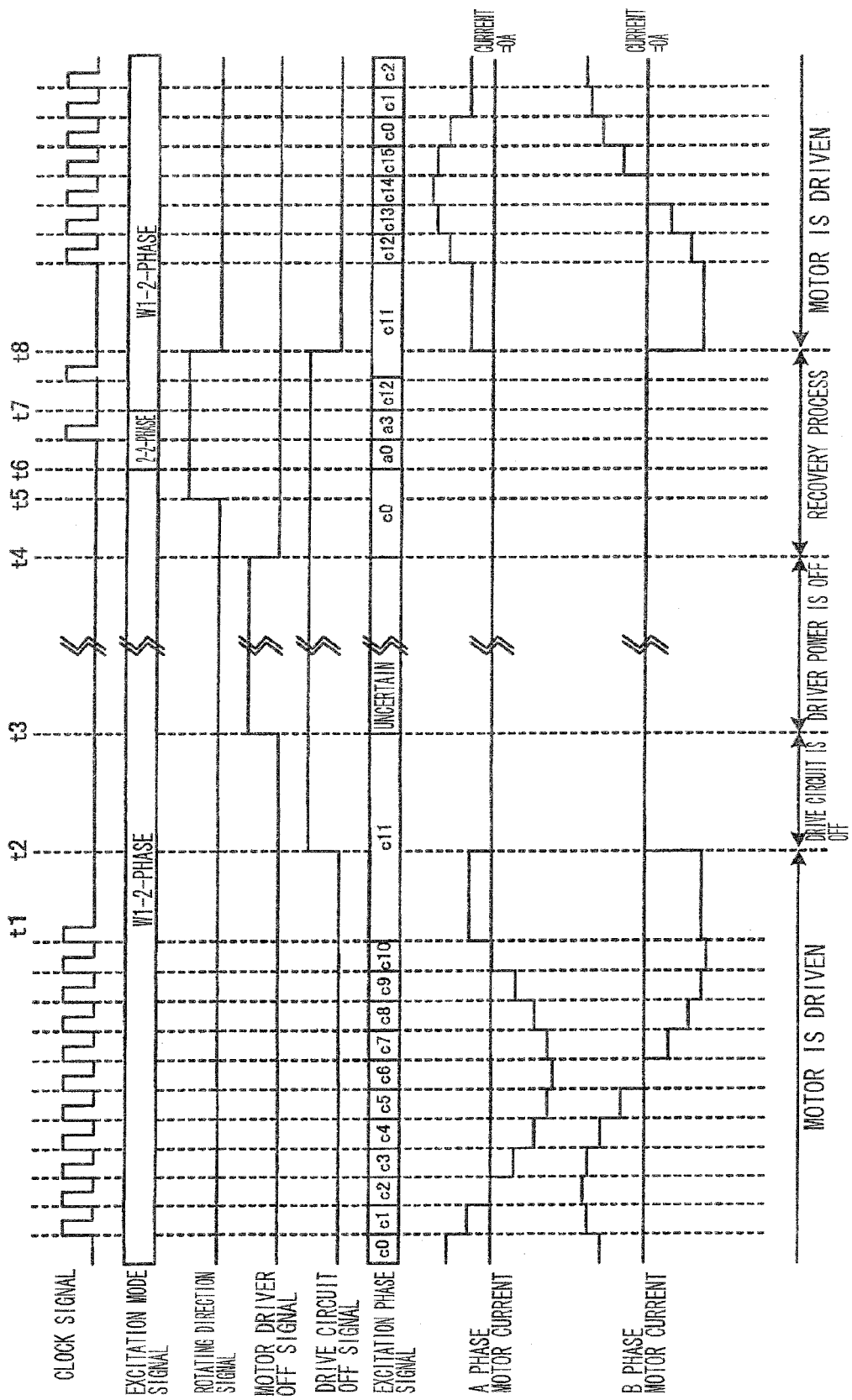
FIG. 7 is a timing chart showing a series of events occurring during the motor control process.

FIG. 7 is a timing chart showing a series of events beginning from the motor 23 being driven, to the driver sleep command shutting off the power to the motor driver 60 and the motor 23 being re-driven after the recovery process. FIG. 7 includes the various signals outputted from the timing generation circuit 80 to the motor driver 60, the excitation phase signal outputted from the excitation phase control circuit 62 to the drive circuit 61, and the electric current flowing from the drive circuit 61 to the coils of the motor 23.

Next, various processes mentioned in FIG. 6 of the embodiment will be described while referring to the timing chart in FIG. 7, including the drive process of S90, the excitation phase storage process of S70, and the recovery process of S82.

Drive Process

FIG. 8 is a flowchart illustrating steps in the drive process of S90 in FIG. 6. The CPU 71 executes this drive process, for example, when the driver power flag is ON (S81: ON) and a motor drive command is issued (S52: Y).

In S91 the CPU 71 issues a command to the timing generation circuit 80 to transmit a drive circuit OFF signal of a low level. Upon receipt of this command, the timing generation circuit 80 switches the drive circuit OFF signal to the low level. The drive circuit 61 turns on when the drive circuit OFF signal switches to the low level.

In S92 the CPU 71 issues instructions to the timing generation circuit 80 to begin transmitting the excitation mode signal, rotating direction signal, and clock signal. That is, the CPU 71 transmits a drive start signal to the drive timing generation circuit 81. As will be described later, at this time, the selectors 86, 87, and 88 are on the A terminal side. So, the selectors 86, 87, and 88 select the excitation mode signal, rotating direction signal, and clock signal that are outputted from the drive timing generation circuit 81, and transfer them to the excitation phase control circuit 62. Upon receiving these signals, the excitation phase control circuit 62 outputs to the drive circuit 61 an excitation phase signal indicating the excitation phase updated for each pulse of the clock signal. The excitation phase signal instructs the drive circuit 61 to supply corresponding drive current. As a result, the motor 23 is rotated to a position corresponding to the excitation phase updated for each pulse of the clock signal.

The motor drive section of FIG. 7 shows an example in which the timing generation circuit 80 outputs W1-2-phase excitation as the excitation mode signal and CCW as the rotating direction signal. The excitation phase control circuit 62 outputs the excitation phase signal for each pulse of the clock signal, and the drive circuit 61 supplies drive current to the coils in the motor 23 in response to the excitation phase signal.

In S93 the CPU 71 determines whether a motor halt command has been issued. If a motor halt command has not been issued (S93: N), the CPU 71 continues to wait at S93. The CPU 71 issues a motor halt command according to a process well known in the art when a well-known sensor detects that the reading unit 21 has moved from one end to the other end of the image-reading device 1 in the longitudinal direction thereof, for example.

The motor 23 continues to be driven while a motor halt command has not been issued (S93: N). When the motor halt command is issued (S93: Y), the process advances to S94. In S94 the CPU 71 halts clock signal transmission from the timing generation circuit 80.

In S95 the CPU 71 controls the timing generation circuit 80 to switch the drive circuit OFF signal to high level, shutting off the drive circuit 61. Subsequently, the CPU 71 ends the drive process.

As shown in the motor drive section of FIG. 7, if the motor halt command is issued at a time t1 (S93: Y), in S94 the clock signal is suspended. Then, in S95 the drive circuit 61 is shut off at a time t2 in FIG. 7.

After input of the clock signal is suspended at time t1, the excitation phase control circuit 62 preserves the state of the excitation phase (c11 in this example). The drive circuit 61 is shut off by the drive circuit OFF signal at time t2. However, electricity is still supplied to the excitation phase control circuit 62 because the power supply to the motor driver 60 remains on. Therefore, even though the drive circuit 61 is shut off at time t2, the excitation phase control circuit 62 continues to hold the excitation phase c11.

Next, the excitation phase storage process will be described with reference to the flowchart in FIG. 9. One example in which the CPU 71 performs this excitation phase storage process is in S70 of FIG. 6 after determining in S50 that a driver sleep command was issued in the parallel process of FIG. 5 (S50: Y). The CPU 71 makes this determination at a point in time slightly past time t2 in FIG. 7 and before time t3.

Figure 9:
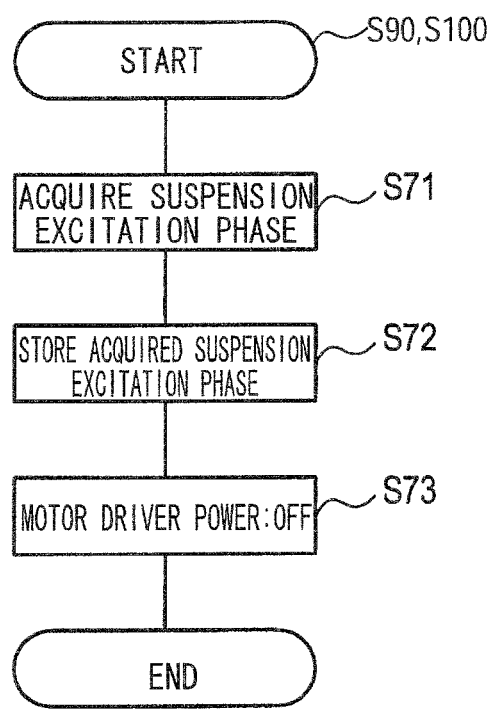
FIG. 9 is a flowchart illustrating steps in an excitation phase storage process shown in the motor control process of FIG. 6.

In S71 at the beginning of the process in FIG. 9, the CPU 71 first acquires the current excitation phase from the excitation phase acquisition unit 90 as the final excitation phase prior to cutting off power to the motor driver 60. The final excitation phase prior to cutting off power to the motor driver 60 is referred to as "suspension excitation phase". Through the operations of the excitation phase acquisition unit 90 described above, the CPU 71 recognizes that the excitation phase of the excitation phase control circuit 62 at a point slightly after time t2 in FIG. 7 is c11.

In S72 the CPU 71 stores data indicating the acquired excitation phase in an excitation phase storage area allocated in the EEPROM 74. In S73 the CPU 71 switches the motor driver OFF signal to the high level through the timing generation circuit 80. More specifically, the CPU 71 issues a command for the timing generation circuit 80 to output the motor driver OFF signal (high level) as a command for throwing the switch 65 of the power supply 66 to the OFF position. Through this process, the power supply of the motor driver 60 is switched off, and the excitation phase storage process ends.

Because power is not supplied to the motor driver 60 between time t3 and time t4 in FIG. 7, the excitation phase control circuit 62 no longer retains the excitation phase c11 and therefore the current excitation phase becomes uncertain. However, data indicating the excitation phase c11 is stored in the EEPROM 74 in S72 of FIG. 9.

The excitation phase storage process performed during a process for shutting off the main power supply (S100 of FIG. 6) is identical to the process described above. Accordingly, the final excitation phase prior to cutting off the power supply (suspension excitation phase) is saved in the EEPROM 74 even after cutting off the power supply to the image-reading device 1.

Recovery Process

Next, the recovery process will be described with reference to the flowchart in FIG. 10. The following example describes the recovery process performed in S82 of FIG. 6. For example, it is conceivable that, after determining in S50 that a driver sleep command was issued (S50: Y) and executing the processes in S70 and S80, the CPU 71 determines at the time t4 in FIG. 7 that the driver sleep command was canceled (S50: N) and in accordance therewith that a pre-drive process command was issued (S51: Y) in order to arrive at the recovery process of S82. The recovery process of S20 performed immediately after the power supply to the image-reading device 1 is turned on is identical to the recovery process of S82.

In S21 at the beginning of the process in FIG. 10, the CPU 71 transmits a select signal to the timing signal output selector 85, switching the selectors 86, 87, and 88 in the timing signal output selector 85 to the B terminal side. In S22 the CPU 71 turns on the power supply to the motor driver 60 by issuing a command to switch the motor driver OFF signal to the low level.

At time t4, the power supply of the motor driver 60 is on, but the timing generation circuit 80 is supplying a drive circuit OFF signal (high level) to the drive circuit 61 for shutting off the same. Therefore, while the excitation phase control circuit 62 is powered and in an operation-ready state, the drive circuit 61 is not operable. Accordingly, the motor 23 does not rotate in the following process, even when the excitation phase is updated.

As described above, the excitation phase of the excitation phase control circuit 62 is set to the initial excitation phase when resuming the supply of electricity to the motor driver 60. Therefore, the excitation phase of the excitation phase control circuit 62 is c0 at time t4.

In S23 the CPU 71 outputs the initial excitation phase setting signal to the up/down counter 95. Accordingly, the excitation phase acquisition unit 90 acquires the initial excitation phase. In S24 the CPU 71 acquires the suspension excitation phase that was stored in the EEPROM 74 in the process of S72 of FIG. 9 indicating the final excitation phase prior to cutting off the power supply to the motor driver 60.

In the example of FIG. 7, data indicating the excitation phase c11 was stored in the EEPROM 74 in S72 as the final excitation phase prior to cutting off the power supply (suspension excitation phase). However, because the excitation phase of the excitation phase control circuit 62 is updated beginning from c0, it is necessary to reset the excitation phase of the excitation phase control circuit 62 to c11.

Therefore, in S25 the CPU 71 determines the rotating direction that requires the fewest number of steps to change the excitation phase of the motor 23 from the initial excitation phase to the excitation phase stored in the EEPROM 74 just prior to cutting off power to the motor driver 60. When the CPU 71 determines this rotating direction, the ASIC 70 controls the timing generation circuit 80 to transmit the rotating direction signal corresponding to the determined direction to the excitation phase control circuit 62. That is, the CPU 71 outputs a rotating direction signal specifying the determined direction to the selector 88 in the timing signal output selector 85.

Based on the drawing in FIG. 2, it is clear that the motor 23 will arrive more quickly at excitation phase c11 when rotated clockwise from the initial excitation phase c0. Therefore, at time t5 in FIG. 7 the CPU 71 commands the timing generation circuit 80 to send CW (clockwise) as the rotating direction signal, by outputting the rotating direction signal specifying the CW direction to the selector 88.

Figure 11:
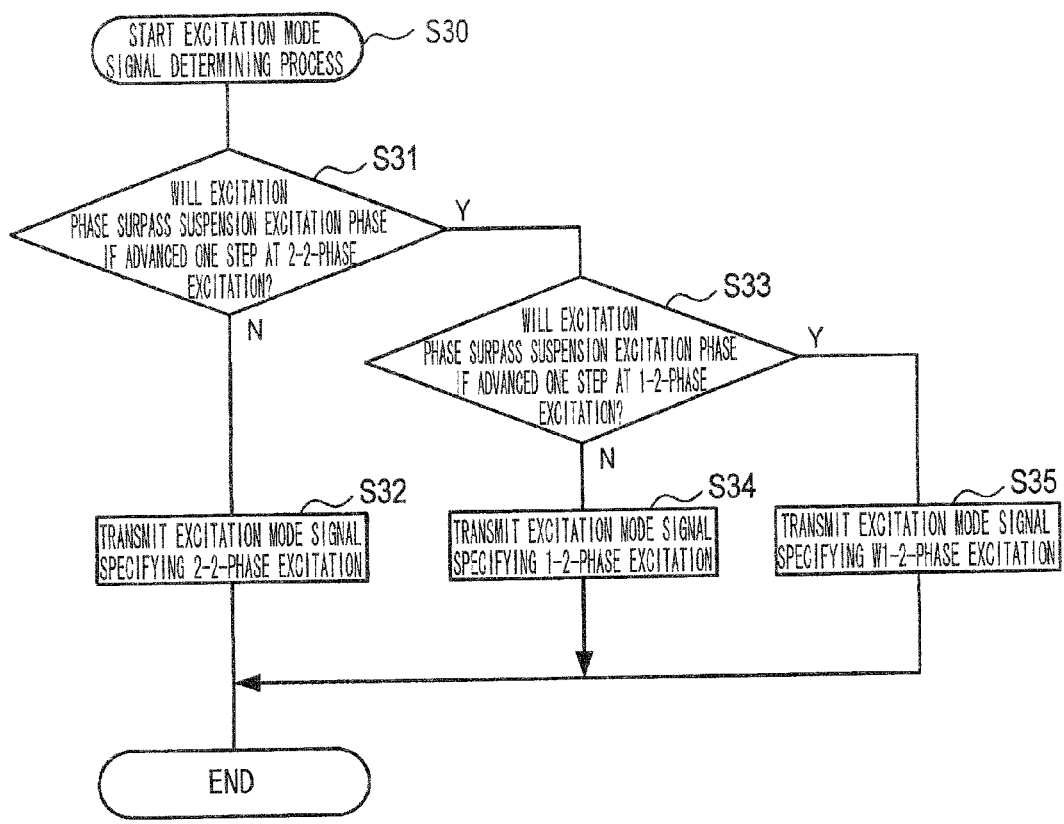
FIG. 11 is a flowchart illustrating steps in an excitation mode signal determining process shown in the recovery process of FIG. 10.

In S30 the CPU 71 executes an excitation mode signal determining process that will be described here with reference to FIG. 11. FIG. 11 is a flowchart illustrating steps in the excitation mode signal determining process. In S31 at the beginning of the process in FIG. 11, the CPU 71 determines whether the excitation phase would surpass the final excitation phase prior to shutting off the power (suspension excitation phase) if the phase were advanced one step at 2-2-phase excitation in the rotating direction determined in S25 of FIG.

10. If the excitation phase would not surpass the suspension excitation phase (S31: N), in S32 the CPU 71 transmits to the selector 87 in the timing generation circuit 80 an excitation mode signal specifying 2-2-phase excitation as the excitation mode, and subsequently ends the excitation mode signal determining process.

However, if the excitation phase would surpass the saved suspension excitation phase when advanced one step at 2-2-phase excitation (S31: Y), in S33 the CPU 71 determines whether the excitation phase would surpass the saved suspension excitation phase when advanced one step at 1-2-phase excitation in the rotating direction determined in S25. If the excitation phase would not surpass the saved suspension excitation phase (S33: N), in S34 the CPU 71 transmits to the selector 87 an excitation mode signal specifying 1-2-phase excitation as the excitation mode, and subsequently ends the excitation mode signal determining process.

However, when the excitation phase would surpass the saved suspension excitation phase when advanced one step at 1-2-phase excitation (S33: Y), in S35 the CPU 71 transmits to the selector 87 an excitation mode signal specifying W1-2-phase excitation as the excitation mode, and subsequently ends the excitation mode signal determining process.

Returning to FIG. 10, after completing the excitation mode signal determining process of S30, in S40 the CPU 71 determines whether the current excitation phase indicated by the excitation phase signal is equivalent to the final excitation phase prior to the power being shut off (suspension excitation phase). The CPU 71 acquires the current excitation phase through the excitation phase acquisition unit 90. When the current excitation phase is not equivalent to the final excitation phase before powering off (S40: N), in S41 the CPU 71 determines whether the elapsed time Tw after the previous clock signal was transmitted is less than the prescribed time tb. Note that if a clock signal has not yet been transmitted at the time when the process of S41 is executed, the CPU 71 defines the elapsed time Tw as the elapsed time from the point that the negative determination was made in S40.

As described already, the prescribed time tb is a pulse interval for a clock signal that is greater than or equal to the minimum pulse interval at which the excitation phase control circuit 62 can operate while being smaller than the minimum pulse interval at which the motor 23 can operate. Normally, the motor 23 will lose step synchronism when the pulse interval of the clock signal is too small. However, because the motor 23 does not rotate during this recovery process, this problem does not occur even when transmitting a clock signal with this short of pulse interval, and the excitation phase can be quickly matched to the suspension excitation phase, as will be described below. Further, because the prescribed time tb is greater than or equal to the smallest pulse interval at which the excitation phase control circuit 62 can operate, the excitation phase can be switched in the excitation phase control circuit 62.

Hence, the process waits in S41 while the elapsed time Tw is shorter than the prescribed time tb (S41: Y). When the elapsed time Tw becomes longer than or equal to the prescribed time tb (S41: N), the CPU 71 outputs a clock signal to the selector 86 in the timing generation circuit 80 in S42 and the process returns to S30 described above. As shown in FIG. 2, to rotate the motor 23 in a clockwise direction from the initial excitation phase c0 to the final excitation phase c11 prior to shutting off the power supply to the motor driver 60 (suspension excitation phase), the motor may be advanced one step at 2-2-phase excitation, followed by one step at W1-2-phase excitation. Accordingly, at time t6 in FIG. 7, the CPU 71 transmits an excitation mode signal specifying 2-2-phase excitation (S32) and transmits one clock pulse in S42. At time t7 in FIG. 7, the CPU 71 transmits an excitation mode signal specifying W1-2-phase excitation (S35) and transmits one clock pulse in S42. At this point, the excitation phase indicated by the excitation phase signal becomes equivalent to the final excitation phase saved prior to turning off the power (suspension excitation phase).

Thus, when the CPU 71 determines, while repeatedly performing the loop through the processes of S30-S40-S41-S42, that the excitation phase indicated by the excitation phase signal is equivalent to the final excitation phase before power was shut off (suspension excitation phase) (S40: Y), in S43 the CPU 71 switches the selectors 86, 87, and 88 in the timing signal output selector 85 to the A terminal side, and subsequently ends the recovery process. Through this process, the excitation phase signal transmitted from the excitation phase control circuit 62 to the drive circuit 61 matches the final excitation phase prior to the power being turned off when the drive circuit 61 is turned on (S91) in a drive process performed at time t8 in FIG. 7, for example. At this time the drive circuit 61 begins supplying drive current to the A phase coil 23a and B phase coil 23b for rotating the motor 23. Accordingly, the motor controller 50 can rotate the motor 23 beginning from the same angular position that the motor 23 was in before the power supply was cut off.

Further, the motor controller 50 of the embodiment determines a rotating direction in S25 and executes the excitation mode signal determining process of S30 rather than simply setting the pulse interval of the clock signal to the prescribed time tb during the recovery process. Accordingly, the motor controller 50 can very quickly match the excitation phase indicated by the excitation phase signal to the final excitation phase just prior to powering off. Using the example shown by the arrows in FIG. 2 in which c11 was the final excitation phase before the power supply was shut off, the CPU 71 first changes the excitation phase one step in the clockwise direction at 2-2-phase excitation (S32) and subsequently changes the excitation phase one step in the clockwise direction at W1-2-phase excitation (S35). Accordingly, the motor controller 50 of the embodiment can suitably shorten the time required in the recovery process when the motor 23 is in a non-rotating state.

Although the pulse interval of the clock signal in the recovery process is actually shorter than that in the motor control process, the two clock signals are shown to have the same pulse interval in FIG. 7 for convenience.

In the section of FIG. 7 showing the recovery process, excitation phase signals c0 and a0 indicate the same excitation phase, as do excitation phase signals a3 and c12, and do not indicate that the signal has been switched.

Process for Shutting Off the Main Power Supply of the Image-Reading Device

In the example described above with reference to FIG. 7, the power supply of the motor driver 60 is turned off by a driver sleep command. The following example describes the case in which the power supply of the motor driver 60 is turned off when the main power supply of the image-reading device 1 is shut down.

In the embodiment, the CPU 71 executes the excitation phase storage process of S100 as shown in FIG. 9 after determining in S53 that a command was issued to shut off the main power supply of the image-reading device 1 (S53: Y). Thus, the CPU 71 stores the excitation phase just before shutting off the power in the EEPROM 74, as described above, and subsequently shuts off the power supply of the motor driver 60 and the main power supply of the image-reading device 1. The excitation phase just before shut off of the power supply of the motor driver 60 is referred to also as "suspension excitation phase," although the shut off of the power supply is executed in order to shut off the main power supply of the image-reading device 1. When a subsequent command is issued to turn on the main power supply of the image-reading device 1, the CPU 71 executes the recovery process of S20 as shown in FIG. 10. As described above for the recovery process, the CPU 71 matches the excitation phase of the motor driver 60 to the final excitation phase before shutting off the power supply (suspension excitation phase) while maintaining the drive circuit 61 in an OFF state and the motor 23 in a non-rotating state. Accordingly, the CPU 71 can resume driving the motor 23 from the position at which it was halted previously, even when the power supply of the motor driver 60 was switched off because the main power supply was turned off. In other words, when the next motor drive command is issued (S52: Y), the drive circuit OFF signal is set to the low level in S91 in the drive process of S90, after which electric current corresponding to the final excitation phase before the power supply was turned off (suspension excitation phase) is applied to the A phase coil 23$a$ and B phase coil 23$b$.

It is noted that at time t2 when the supply of power to the drive circuit 61 is turned off, the supply of power to the motor 23 is turned off. As a result, the rotor in the motor 23 angularly shifts from the last angular position, corresponding to the suspension excitation phase c11, to an unknown angular position due to a detent torque. The rotor stays at the unknown angular position until the supply of power to the motor 23 is recovered next, that is, at time t8. The CPU 71 cannot grasp the amount by which the rotor has shifted from the last angular position, corresponding to the suspension excitation phase c11, to the unknown angular position. When the rotor thus shifts from the last angular position to the unknown position, the reading unit 21 moves from the last position that corresponds to the last angular position of the rotor, to an unknown position that corresponds to the unknown angular position of the rotor. The CPU 71 cannot grasp the amount by which the reading unit 21 has moved from the last position to the unknown position.

When the power supply for the drive circuit 61 is turned on at time t8, the rotor rotates from the unknown angular position back to the last angular position corresponding to the final excitation phase c11 before the power supply was shut off. This ensures that the reading unit 21 moves from the unknown position back to the last position before the power supply was shut off.

It can therefore be said that when the drive circuit 61 is turned off at time t2, the rotor rotates from the last angular position to the unknown angular position, and when the drive circuit 61 is turned on at time t8, the rotor rotates from the unknown angular position back to the last angular position. In accordance with this rotation of the rotor, the reading unit 21 moves from the last position to the unknown position, and then moves back to the last position. So, even though the CPU 71 does not exactly know where the rotor resides during the period between time t2 and time t8 due to the detent torque, when the image-reading device 1 is awakened from the sleep mode, the rotor can resume its rotation accurately from the final angular position prior to powering off. So, the reading unit 21 can resume its movement accurately from the final position prior to powering off. The position of the reading unit 21 can be controlled accurately.

Now assume a comparative example, in which the power supply for the drive circuit 61 is turned on at time t4 simultaneously when the power supply for the motor driver 60 is turned on. In this case, the drive circuit 61 begins supplying a drive current to the motor 23 at time t4. As a result, the rotor in the motor 23 rotates from the unknown angular position first to a predetermined initial angular position corresponding to the initial excitation phase c0. Afterwards, the rotor rotates from the initial angular position in succession to the last angular position corresponding to the suspension excitation phase c11. So, the rotor rotates from the unknown angular position through the initial angular position to the last angular position. In accordance with this rotation of the rotor, the reading unit 21 moves from the unknown position. The CPU 71 does not grasp the amount, by which the rotor has rotated from the last angular position to the unknown angular position, and the amount, by which the rotor rotates from the unknown angular position to the initial angular position. The CPU 71 does not accurately know the distance by which the reading unit 21 moves in association with the rotation of the rotor. So, the CPU 71 does not accurately know where the reading unit 21 is located when the image-reading device 1 is awakened from the sleep mode. It is impossible to accurately control the position of the reading unit 21 after the image-reading device 1 is awakened from the sleep mode.

Contrarily, the stepping motor controller 50 according to the embodiment described above turns on the drive circuit 61 to rotate the motor 23 after the excitation phase of the excitation phase control circuit 62 first matches the final excitation phase before the power supply was turned off. That is, the process of S91 is executed in the drive process of S90 after the affirmative judgment is executed in S40 in the recovery process of S20 or S82. Accordingly, the stepping motor controller 50 according to the embodiment can begin rotating the motor 23 from its last angular position before the power supply for the motor driver was turned off. It is possible to accurately control the position of the reading unit 21 after the image-reading device 1 is awakened from the sleep mode.

The excitation phase prior to the power supply of the motor driver 60 being shut off may be stored in the RAM 73 rather than the EEPROM 74 for recovering from the sleep mode.

It is preferable to store the final excitation phase prior to the power supply being shut off in the EEPROM 74 when shutting off the main power supply for the image-reading device 1. Since the EEPROM 74 is nonvolatile memory, storing the final excitation phase before the power supply of the motor driver 60 is turned off in the EEPROM 74 enables the image-reading device 1 to begin rotating the motor at its angular position prior to shutting off the power through the recovery process of S20 performed when the main power supply is turned back on.

During the recovery process of the embodiment, the pulse interval for the clock signal is set to the prescribed time tb, which is smaller than the pulse interval at which the motor 23 can operate, and the rotating direction and excitation mode are set so as to minimize the number of clock pulses during the recovery process (S25, S30). Hence, the stepping motor controller of the embodiment can quickly match the excitation phase signal to the signal indicating the final excitation phase prior to shutting off the power supply, thereby quickly resuming driving of the motor 23.

Moreover, the recovery process of S82 is executed in parallel with the scan preparation processes of S8. More specifically, in parallel with the scan preparation processes (adjustment process) of S8, the recovery process of S82 is completed, in which the drive circuit 61 continues to halt supply of the drive current to the stepping motor 23 until the excitation phase signal is updated to the excitation phase signal specifying the suspension excitation phase. So, a scan process on the image-reading device 1 can be initiated quickly.

While the invention has been described in detail with reference to the specific embodiment thereof, it would be apparent to those skilled in the art that many modifications and variations may be made therein without departing from the spirit of the invention, the scope of which is defined by the attached claims.

For example, the excitation phase storage process of S70 may be modified as follows.

In this modification, the CPU 71 determines the final excitation phase before the power supply to the motor driver 60 is turned off, without using the excitation phase acquisition unit 90.

Figure 12:
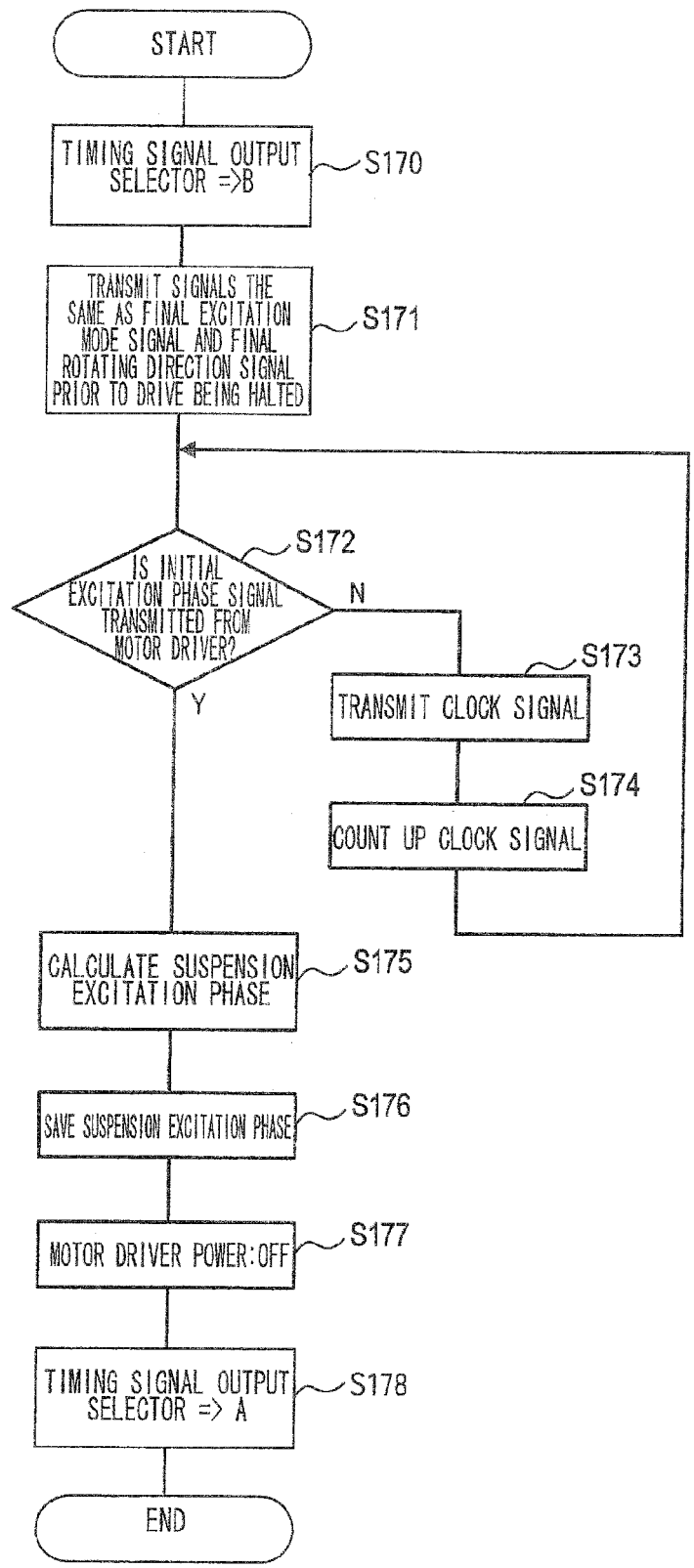
FIG. 12 is a flowchart illustrating steps in a variation of the excitation phase storage process of FIG. 9.

FIG. 12 is a flowchart illustrating steps in a variation of the excitation phase storage process in S70. The CPU 71 executes the excitation phase storage process while the drive circuit OFF signal is at the high level and therefore the motor 23 is in a non-rotating state (see S95 in FIG. 8).

In S170 at the beginning of the excitation phase storage process in FIG. 12, the CPU 71 transmits a select signal to the selectors 86, 87, and 88 to switch the selectors 86, 87, and 88 to the B terminal side.

Next, in S171, the CPU 71 outputs an excitation mode signal that is the same as the final excitation mode signal prior to the drive of the motor 23 being halted and a rotating direction signal that is the same as the final rotating direction signal prior to the drive of the motor 23 being halted, thereby letting the timing generation circuit 80 transmit, to the excitation phase control circuit 62, signals the same as the final excitation mode signal and the final rotating direction signal prior to the drive of the motor 23 being halted.

In S172 the CPU 71 determines whether the initial excitation phase signal is transmitted from the excitation phase control circuit 62 to the timing generation circuit 80.

If the initial excitation phase signal is not transmitted from the excitation phase control circuit 62 (S172: N), in S173 the CPU 71 transmits a clock signal to the excitation phase control circuit 62.

In S174 the CPU 71 counts the pulse of the clock signal, and the process subsequently returns to S172. In this way, the CPU 71 repeatedly executes the processes in S172-S174. During this loop, the CPU 71 transmits a clock signal in S173 and counts the number of the pulses in the clock signal in S174. When the initial excitation phase signal is transmitted from the excitation phase control circuit 62 during this loop (S172: Y), the process advances to S175.

In S175 the CPU 71 calculates the final excitation phase before the drive of the motor 23 was halted (suspension excitation phase) based on the excitation mode signal and rotating direction signal transmitted in S171 and the number of clock signal transmissions counted up in S174. For example, if the excitation mode indicated by the excitation mode signal is W1-2-phase excitation and the rotating direction indicated by the rotating direction signal is counterclockwise, the CPU 71 determines that the final excitation phase before the drive was halted (suspension excitation phase) is c15, when the initial excitation phase signal was transmitted in one pulse of the clock signal. Alternatively, if the excitation mode is 1-2-phase excitation and the rotating direction is clockwise, the CPU 71 determines that the final excitation phase before the drive was halted (suspension excitation phase) is b2 when the initial excitation phase signal was transmitted in two clock pulses.

In S176 the CPU 71 saves the thus calculated suspension excitation phase in the EEPROM 74 (excitation phase storage area). In S177 the CPU 71 shuts off the power supply to the motor driver 60. Next, in S178 the CPU 71 switches the selectors 86, 87, and 88 back to the A terminal side, and subsequently ends the excitation phase storage process.

By applying this variation of the excitation phase storage process, the suspension excitation phase can be acquired only through the process that is executed before the power supply to the motor driver 60 is turned off. The excitation phase acquisition unit 90 can be eliminated from the timing generation circuit 80, thereby reducing the load on the ASIC 70 when driving the motor 23. On the other hand, when employing the excitation phase storage process of FIG. 9, the motor controller 50 can instantaneously acquire and store the final excitation phase before the power supply is turned off, thereby shortening the time required for interrupting power to the motor driver 60.

In the above description, the CPU 71 transmits the excitation mode signal the same as the final excitation mode signal prior to drive of the motor 23 being halted and the rotating direction signal the same as the final rotating direction signal prior to drive of the motor 23 being halted in S171, judges whether the initial excitation phase signal is transmitted from the excitation phase control circuit 62 in S172, and transmits the clock signal in S173. Instead, the drive timing generation circuit 81 may transmit the excitation mode signal the same as the final excitation mode signal prior to drive of the motor 23 being halted and the rotating direction signal the same as the final rotating direction signal prior to drive of the motor 23 being halted in S171. The timing generation circuit 80 may judge whether the initial excitation phase signal is transmitted from the excitation phase control circuit 62 in S172. The drive timing generation circuit 81 may transmit the clock signal in S173. In other words, the timing generation circuit 80 may control the drive timing generation circuit 81 to transmit the final excitation mode signal prior to drive of the motor 23 being halted and the final rotating direction signal prior to drive of the motor 23 being halted and repeatedly transmit the clock signal until the initial excitation phase signal is transmitted from the excitation phase control circuit 62. In this case, the processes of S170 and S178 are omitted. The CPU 71 executes the processes of S174, S175, S176 and S177.

It is noted that the excitation phase storage process of S100 may be modified similarly as described above for the excitation phase storage process of S70 with reference to FIG. 12.

In the embodiment described above, the stepping motor controller of the present invention is applied to a stepping motor used in an image-reading device, but the stepping motor controller of the present invention may be applied to a stepping motor used in an inkjet printer, XY plotter, or other image-forming device; a sewing machine; a machine tool; or other device. Such devices can sometimes be placed in a sleep mode in which the power supply to the motor driver 60 is turned off while maintaining the power supply to the ASIC 70 on. In such instances, the present invention demonstrates the significant advantages described above. The excitation phase acquisition unit 90 may also be configured in a variety of ways. For example, the motor driver 60 may feed back the excitation phase signal itself to the excitation phase acquisition unit 90.

What is claimed is:

1. A stepping motor controller for controlling a stepping motor, the stepping motor controller comprising:
   a motor driver that is configured to drive a stepping motor; and
   a motor driver control unit that is configured to control the motor driver,
   the motor driver comprising:
   an excitation phase control unit that is configured to receive pulses of a clock signal and to update and output an excitation phase signal indicating an excitation phase of the stepping motor in response to each pulse of the clock signal; and a drive unit that is configured to receive the excitation phase signal and to supply a drive current to the stepping motor, the drive current corresponding to the excitation phase indicated by the received excitation phase signal, the motor driver control unit comprising:

a motor driver power control unit that controls whether or not to supply electricity to the motor driver;

a drive control unit that instructs the drive unit to supply the drive current to the stepping motor or to stop supplying the drive current to the stepping motor;

a clock signal output unit that outputs the clock signal to the excitation phase control unit; and an excitation phase storing unit that acquires an excitation phase at a time when the motor driver power control unit stops supplying electricity to the motor driver, and stores the acquired excitation phase as a suspension excitation phase;

wherein the excitation phase control unit is configured to start updating the excitation phase signal from an excitation phase signal specifying a predetermined initial excitation phase when the motor driver power control unit starts supplying electricity to the motor driver, wherein when the motor driver power control unit resumes supplying electricity to the motor driver, the drive control unit instructs the drive unit to continue stopping supply of the drive current while the excitation phase signal outputted from the excitation phase control unit is updated from the excitation phase signal specifying the predetermined initial excitation phase to an excitation phase signal specifying the suspension excitation phase, and instructs the drive unit to start supplying the drive current after the excitation phase signal has reached the excitation phase signal specifying the suspension excitation phase.

2. The stepping motor controller according to claim 1, wherein the clock signal output unit outputs the each pulse of the clock signal with a pulse interval, which is greater than or equal to a first minimum pulse interval, at which the excitation phase control unit can operate, and which is less than a second minimum pulse interval, at which the stepping motor can operate, while the excitation phase signal is updated from the excitation phase signal specifying the predetermined initial excitation phase to the excitation phase signal specifying the suspension excitation phase, and outputs the each pulse of the clock signal with another pulse interval greater than or equal to the second minimum pulse interval after the excitation phase signal has reached the excitation phase signal specifying the suspension excitation phase.

3. The stepping motor controller according to claim 1, wherein the motor driver control unit further comprises:

an excitation mode setting unit that sets an excitation mode defining an amount by which the excitation phase control unit updates the excitation phase signal in response to each pulse of the clock signal; and a rotating direction setting unit that sets a rotating direction defining a direction in which the excitation phase control unit updates the excitation phase of the excitation phase signal in response to each pulse of the clock signal;

wherein the excitation mode setting unit and the rotating direction setting unit respectively set the excitation mode and the rotating direction that minimize a number of pulses of the clock signal that is required for the excitation phase signal to be updated from the excitation phase signal specifying the predetermined initial excitation phase to the excitation phase signal specifying the suspension excitation phase after the motor driver power control unit resumes supplying electricity to the motor driver and while the drive control unit instructs the drive unit to continue stopping supply of the drive current.

4. The stepping motor controller according to claim 1, wherein the excitation phase control unit is configured to output an initial-excitation-phase indicating signal to the motor driver control unit when outputting the excitation phase signal specifying the predetermined initial excitation phase;

the motor driver control unit further comprises:

an excitation mode setting unit that sets an excitation mode defining an amount by which the excitation phase control unit updates the excitation phase signal in response to each pulse of the clock signal;

a rotating direction setting unit that sets a rotating direction defining a direction in which the excitation phase control unit updates the excitation phase of the excitation phase signal in response to each pulse of the clock signal;

an initial-excitation-phase indicating signal acquisition unit that acquires the initial-excitation-phase indicating signal from the excitation phase control unit when the excitation phase control unit outputs the excitation phase signal specifying the predetermined initial excitation phase; and a counting unit that counts the number of pulses in the clock signal;

wherein the drive control unit instructs the drive unit to stop supplying the drive current to the stepping motor before the motor driver power control unit stops supplying electricity to the motor driver;

the clock signal output unit continues outputting the clock signal during a period of time after the drive unit stops supplying the drive current to the stepping motor until the initial-excitation-phase indicating signal acquisition unit acquires the initial-excitation-phase indicating signal; and the excitation phase storing unit acquires the suspension excitation phase based on: the number of pulses that the counting unit has counted during the period of time; the excitation mode by which the excitation phase signal has been updated during the period of time; and the rotating direction in which the excitation phase signal has been updated during the period of time.

5. The stepping motor controller according to claim 1, wherein the motor driver control unit further comprises an excitation phase acquisition unit that acquires the excitation phase specified by the excitation phase signal by counting the number of pulses in the clock signal; and the excitation phase storing unit acquires the excitation phase that has been acquired by the excitation phase acquisition unit when the motor driver power control unit stops supplying electricity to the motor driver, and stores this excitation phase as the suspension excitation phase.

6. The stepping motor controller according to claim 1, wherein the excitation phase storing unit saves the suspension excitation phase in a nonvolatile memory.

7. An image-reading device comprising:

the stepping motor controller according to claim 1;

a reading unit that is configured to use the rotation of the stepping motor in operations for reading images; and an adjusting unit that performs an adjustment to adjust the reading unit before the reading unit begins a read operation;

wherein the drive control unit executes a process, in parallel with the adjustment performed by the adjusting unit, to instruct the drive unit to continue stopping the supply of the drive current to the stepping motor while the excitation phase signal is updated from the excitation phase signal specifying the predetermined initial excitation phase to an excitation phase signal specifying the suspension excitation phase.

* * * * *